Feb. 28, 1961 D. W. NORWOOD 2,972,930
LIGHT METER DEVICE
Filed July 21, 1958 2 Sheets-Sheet 1
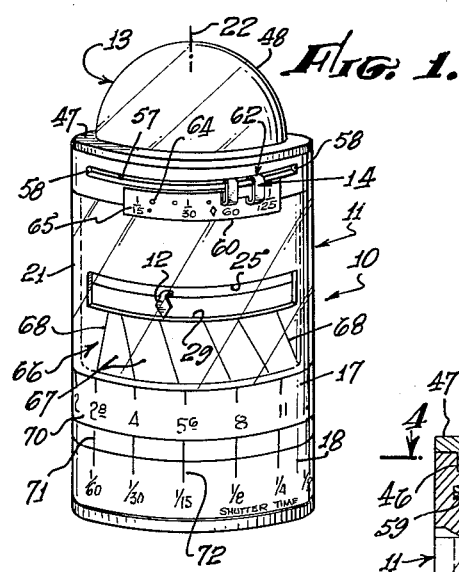
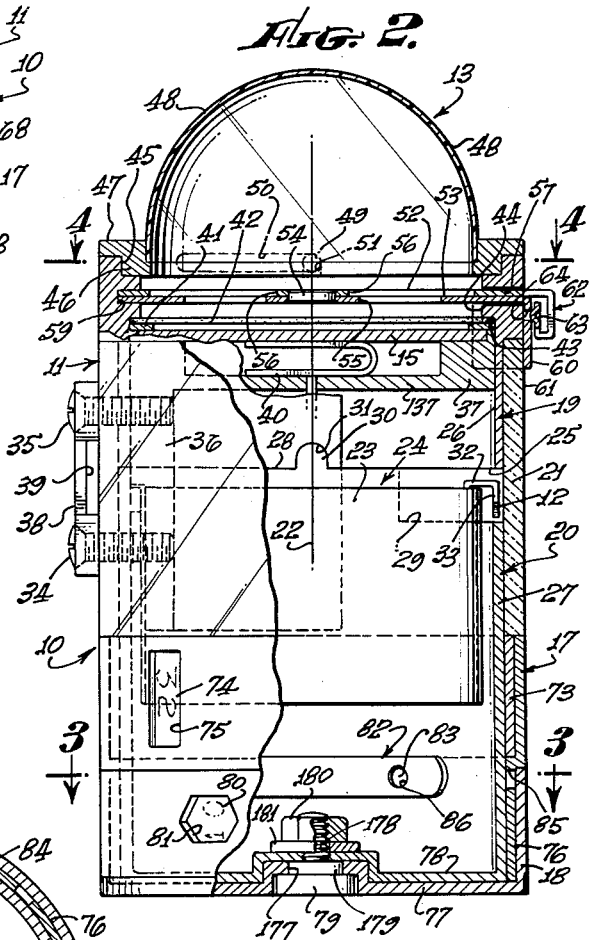
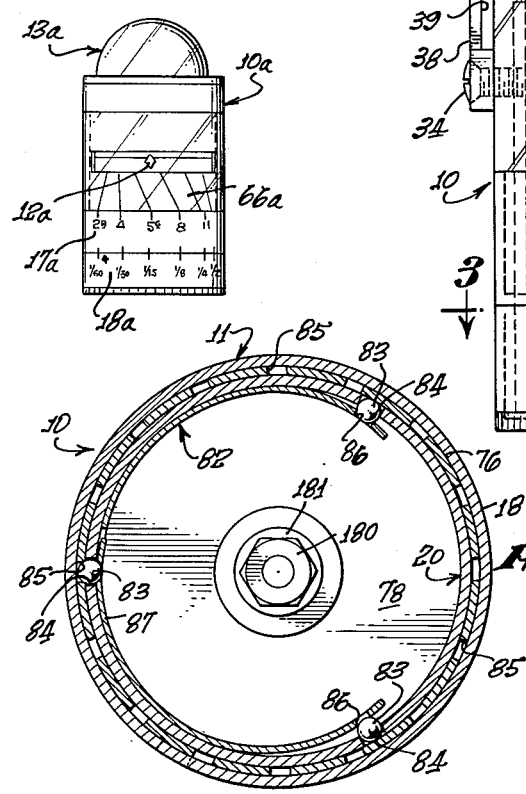
DONALD W. NORWOOD,
INVENTOR.
BY William P. Green
ATTORNEY.

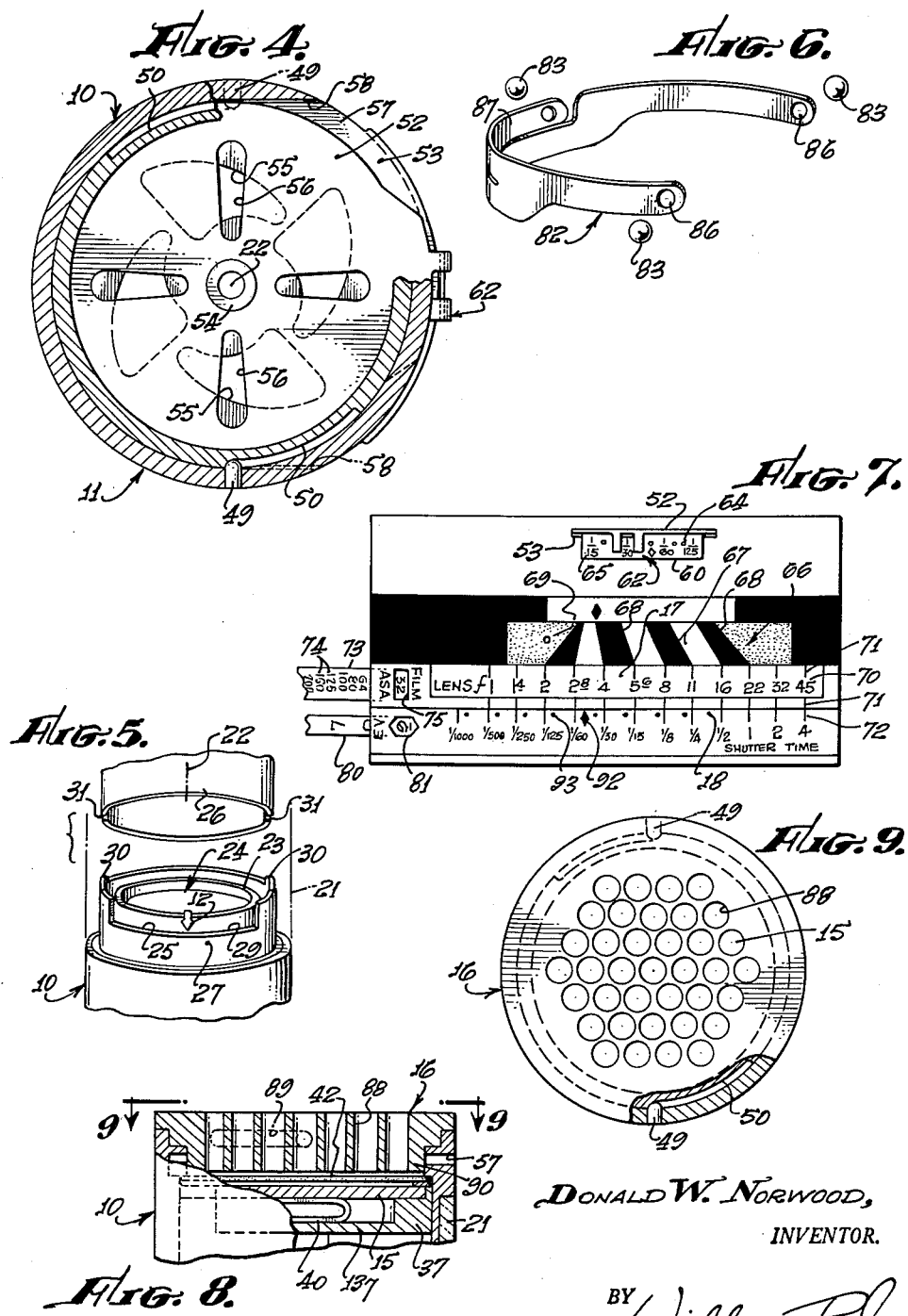

United States Patent Office 2,972,930
Patented Feb. 28, 1961

2,972,930

LIGHT METER DEVICE

Donald W. Norwood, 1470 San Pasqual St., Pasadena, Calif.

Filed July 21, 1958, Ser. No. 749,844

12 Claims. (Cl. 88—23)

This invention relates to improved photographic light meters, for use in determining the proper settings for a camera under different lighting conditions.

In designing a photographic light meter, one of the most difficult problems encountered is that of so designing the device as to have complete versatility of operation, to function effectively under any and all circumstances which can possibly be met, while at the same time avoiding undue complication of either the mode of operation, structure or appearance of the meter. As will be understood, the many possible variations in lighting conditions, lens settings, shutter times and film sensitivities, all tend to require considerably increased complexity in a meter device, and consequently tend to decrease the facility with which an average person can use a meter. With this in mind, a major object of the present invention is to provide a meter in which complete versatility and operational accuracy are attained, but in which this is accomplished with a much simpler structure and mode of operation than has heretofore been possible. A further object of the invention is to design the meter so that it can be extremely small in size, compact, and yet can have relatively large, easily readable scale markings.

These results are achieved in large part by a very unique arrangement in which the light controlled pointer or indicator part is so located that its position can be read through a channel chart on each of two movable scale members. One of these members carries a lens aperture scale on which the pointer position is readable, while the other member carries a shutter time scale against which both the pointer setting and the lens aperture scale are readable. As will be brought out in greater detail at a later point, this capacity of each scale to be read against both the pointer and the other scale enables the meter in very unique manner to give two entirely separate and distinct types of readings. One of these is a very direct and extremely simple type of reading, which can be used under most of the different photographic conditions which are normally encountered, say 90% of the time, while the other type of reading is somewhat less direct but is more versatile and can be used to satisfy all less frequently encountered conditions. In the first type of reading, for the "usual" situations, the position of the pointer track is read directly on the lens aperture scale. In the second type of reading, for the "unusual" situations, the shutter time scale is first set relative to the pointer track, by positioning an appropriate index opposite the pointer track, and the relationship between the two scale members then gives an infinite number of appropriate lens aperture and shutter time combinations which may be used in the camera. Also, in this second situation, the members can be designed to read in terms of Exposure Value (EV) numbers, in addition to their lens aperture and shutter time indications, if desired.

To allow use of the first and simplest type of reading under as many different conditions as possible, I preferably provide light valve means in the meter adapted to vary the percentage of the available light which can pass to the photovoltaic cell. This valve structure may be actuable to several different conditions designated in terms of different camera shutter times, so that actuation of the valve to a particular one of these conditions will automatically render the meter direct reading for the corresponding shutter time. Also, the device may be adjustable to different film sensitivity settings by movement of the lens aperture scale relative to the channel chart.

A meter embodying the invention can be utilized to give either incident light or reflected light readings. Conversion between these two conditions can be easily effected by merely removing an easily detachable incident light collector unit from the meter, and substituting a reflected light transmitting unit. When the latter is in position, it is preferred that the light valve assembly be completely removed from the meter. In this connection, an additional feature of the invention has to do with the provision of means on the reflected light unit for blocking off a slot in the meter body into which the valve is inserted when in use. By blocking this slot, the reflected light unit serves the dual purposes of preventing the admission of any stray light into the meter through the slot and also preventing a person from leaving the valve in the meter when reflected light readings are being taken.

A still further feature of the invention relates to a unique manner of preventing electrostatic deflection of the meter pointer by charges developed on a transparent plastic wall through which the pointer is visible. This result is attained by providing uniquely arranged metal wall parts at the inside of the transparent wall, for dissipating, or at least evenly distributing, all electrostatic charges.

The above and other features and objects of the present invention will be better understood from the following detailed description of the typical embodiments illustrated in the accompanying drawings in which:

Fig. 1 is a perspective view of a first form of photographic light meter constructed in accordance with the invention, with the incident light collector dome in position on the meter;

Fig. 2 is an enlarged axial section, partially in elevation, through the Fig. 1 device;

Fig. 3 is a transverse section taken on line 3—3 of Fig. 2;

Fig. 4 is a transverse section taken on line 4—4 of Fig. 2;

Fig. 5 is a fragmentary exploded view of certain portions of the Fig. 1 device;

Fig. 6 is a detailed perspective view of the detenting spring and ball parts of the device;

Fig. 7 is a developed representation of the various scales and associated parts of the meter;

Fig. 8 is a fragmentary section similar to Fig. 2, but on a reduced scale, and showing a reflected light transmitting element connected to the meter in place of the incident light pickup dome;

Fig. 9 is a view taken on line 9—9 of Fig. 8; and

Fig. 10 is a fragmentary representation of a variational form of meter embodying certain features of the invention.

Referring first to Fig. 1, I have shown at 10 a photographic light meter embodying the invention, the body or housing of which is cylindrical in shape, and may be formed of several sections or parts designated generally at 11 in the figures. Light enters the upper end of the meter as it is viewed in Fig. 1, and controls the actuation of an indicator unit whose movable pointer is shown at 12. When the meter is being used for incident light readings, there is attached to the light inlet end of the device an incident light collector unit 13 (including a translucent dome and a mounting ring 47), from which unit the light may pass through a valve assembly 14 before falling on the photovoltaic cell 15 (see Fig. 2) which supplies the electrical energy for actuating pointer 12. When it is desired to utilize the meter for taking reflected light readings, the unit 13 is removed, and a grill or screen 16 (see Figs. 8 and 9) is substituted for that unit, to pass the reflected light in proper amounts to cell 15. Also, the valve assembly 14 is removed from the device when reflected light readings are being taken.

Under most sets of circumstances which are commonly encountered, a proper f-stop setting for the camera is given directly by the positioning of pointer 12 relative to an annular lens aperture scale member 17 (the position of the pointer being read against member 17 through a channel chart 66). When unusual conditions are encountered under which a reading of this direct type can not be obtained, the operator may then take a second and more versatile type of reading by the use of an annular and extended shutter time scale member 18, in conjunction with scale 17, pointer 12 and channel chart 66.

As previously mentioned, the cylindrical outer housing or body 11 of the meter is constructed of several separately formed parts, suitably secured together. More specifically, these housing parts may include two interconnected elements 19 and 20, preferably formed of a metal such as aluminum, and carrying a transparent straight cylindrical third element 21, disposed about parts 19 and 20. Element 21 may be formed of a suitable transparent resinous plastic material, such as methyl methacrylate (Plexiglas) or polystyrene. As seen clearly in Fig. 2, the indicator pointer 12 is positioned closely adjacent transparent wall 21, and is visible from the outside of the meter through that wall. This pointer 12 is mounted for movement arcuately about the main axis 22 of the cylindrical body, to thus follow the inner surface of wall 21 as the pointer moves in response to changes in light intensity.

Ordinarily, if a pointer such as that shown at 12 (which is normally formed of metal) is positioned close to a transparent resinous plastic wall such as that shown at 21, there will be a tendency for the development of electrostatic charges unevenly along wall 21 in a manner such that these charges will deflect pointer 12 and thus cause it to give an incorrect reading. The manner of formation of parts 19 and 20, and of an outer housing 23 disposed about the electrically actuated moving coil microammeter 24 of which pointer 12 is a part (see Fig. 5), is such as to virtually eliminate this electrostatic deflection of pointer 12. More specifically, parts 19 and 20 are so formed as to extend along and continuously contact the entire inner surface of wall 21, except at the location of a window 25 which is just large enough to receive pointer 12, and allow for its arcuate movement within the range of movement of the microammeter. For this purpose, part 19 has a straight cylindrical portion 26 which extends along the inner surface of the upper portion of wall 21, while part 20 has a similar straight cylindrical portion 27 extending along the inner surface of the lower portion of wall 21. These two portions 26 and 27 of parts 19 and 20 meet at 28 in a plane extending transversely of main axis 22, except at the location of window 25, at which location part 20 has an essentially rectangular (but arcuately curving) recess or cutaway 29 to form the discussed viewing window 25. This structure is brought out very clearly in Fig. 5, which also illustrates clearly two diametrically opposite positioning lugs 30 formed on part 20 and projecting axially into similarly shaped recesses 31 in part 19, to key parts 19 and 20 against relative rotation.

The outer housing part 23 which contains the microammeter of which pointer 12 is a part may be of cylindrical configuration, and be centered about axis 22, and is positioned in fairly close proximity to portion 27 of part 20. Cylinder 23, like the parts 19 and 20, is formed of an electrically conductive metal, such as aluminum. Pointer 12 projects upwardly (as seen in Fig. 2) from within the peripheral portion of cylinder 23, and then projects radially outwardly at 32, and ultimately extends axially at 33 in outwardly spaced parallel relation to the outer surface of cylinder 23. It is this portion 33 which coacts with the markings on the outer side of the meter for giving the readings which are to be used in setting a camera.

It is found that the provision of the metal wall 23 at a location opposite window 25 formed by parts 19 and 20 tends to further reduce the chances of developing any uneven electrostatic charges on the exposed or window portion of part 21, so that these parts 19, 20 and 23 function together to virtually eliminate all electrostatic deflection of the pointer. Since the microammeter which is contained within cylinder 23 is of completely conventional construction, no attempt has been made to describe it in any detail.

Part 21 is secured in fixed relation to part 20 by a screw 34 which extends through both of these parts, and also has its inner end extending through an aperture in indicator housing 23 and into a portion 36 of a part 37 which projects axially into housing 23. The indicator unit 24 which is contained within housing 23 may be secured in any suitable manner to part 37, to maintain the indicator in proper position within the body. A second screw 35 extends through parts 21 and 19, and into portion 36 of part 37, to secure these three elements in fixed relation. At the outside of wall 21, screws 34 and 35 may extend through the opposite ends of a rigid metal part 38, which forms between the screws a recess or passage 39 through which a carrying strap or ribbon can pass.

The main upper portion 137 of part 37 is annular, and fits closely within annular part 19. Element 37 may be formed of a suitable opaque, rigid, electrically insulative resinous plastic material. Nested within the axially outer side of portion 137 of part 37, there is positioned the previously mentioned circular photovoltaic cell or disc 15, desirably of the barrier-layer type. A first U-shaped spring contact 40 electrically engages the axially inner side of photovoltaic cell 15, while an annular conductor ring 41 engages the axially outer side of cell 15 about its periphery. The usual electrical leads of course extend from contacts 40 and 41 to the microammeter positioned within cylinder 23, to thus actuate pointer 12 of that microammeter in accordance with the light energization of cell 15. Parts 15, 41, and an upper transparent window 42 may all be held in place by confinement of their peripheral portions between part 37 and an annular shoulder 43 formed in the axially outer portion of part 19. Window 42 may be formed of a clear plastic material, such as cellulose acetate.

Axially beyond shoulder 43, part 19 has an inner cylindrical surface 44, centered about axis 22, and interrupted only for reception of valve unit 14 as will be discussed at a later point. Beyond surface 44, part 19 has an increased diameter inner cylindrical surface 45, forming an annular recess into which there projects a portion 46 of ring 47 to which the light collector dome 48 is rigidly attached. This light collector 48 is a hollow hemisphere in form, preferably made of a translucent resinous plastic material such as cellulose acetate, and may be secured permanently to ring 47 by means of a strong adhesive material. The purpose and functioning of light collector dome 48 is brought out in greater detail in my U.S. Letters Patent Number 2,214,283. Light collector assembly 47—48 is adapted for easy removal from the rest of the meter, and for this purpose may be removably attached to part 19 of the meter by means of a bayonet type of connection, including a pair of pins 49 projecting inwardly from diametrically opposite portions of part 19, and receivable within arcuate grooves 50 formed in the outer surface of ring 47. As will be understood from Fig. 2, each of the grooves 50 is adapted to allow the corresponding pin 49 to move axially into and out of the groove at only one end 51 of the groove. Consequently, the light collector can be attached to the meter by merely moving ring 47 axially into recess 45 with the two parts in the relative rotary positions represented in Fig. 2, following which parts 47 and 48 may be turned through an sufficient distance to lock pins 49 within grooves 50.

The light valve unit 14, which varies the proportion of the available light that is permitted to pass to light sensitive cell 15, is structurally very similar to the valve 15 disclosed in my co-pending application Serial Number 636,541, filed January 28, 1957 on "Direct Reading Light Meter and Light Valve Unit Therefor." More specifically, this unit 14 (see Figs. 2 and 4) consists of a pair of thin flat metal plates 52 and 53, which are connected together for relative rotation about axis 22 by means of a central rivet 54. Plates 52 and 53 extend transversely of axis 22, and have coacting apertures 55 and 56 which act to vary the effective light passing area of the light valve in response to rotary movement of part 52 relative to part 53. As seen clearly in Fig. 4, the apertures 55 in part 53 may be shaped to flare to progressively increasing width as they advance circularly about axis 22, and the apertures 56 in part 52 may be essentially radially extending slots, so that in different rotary positions of part 52, the registering light passing portions of slots 55 and 56 are of different effective sizes.

The valve unit 14 is adapted to be handled as a removable slide structure, which is inserted into the meter body through a slot 57 formed in part 19, the sliding movement of unit 14 being in a plane which extends transversely of axis 22. As seen in Fig. 1, slot 57 extends across the major portion of one side of the meter. This slot is defined at its opposite ends by a pair of end surfaces 58 (see Fig. 4), whose spacing is such as to allow the widest portion of discs 52 and 53 to be inserted through slot 57 into the active position of the valve unit within the meter body. At the side of part 19 which does not contain slot 57, there is formed in the inner wall of part 19, and aligned with slot 57, a semi-circular recess 59 within which the corresponding peripheral portions of parts 52 and 53 are received when unit 14 is in its active position.

Part 53 projects outwardly through slot 57, and is then turned axially to provide a cylindrically curved axially extending flange 60, which extends along and fits closely over the outer cylindrical surfaces 61 of parts 19 and 21. At the opposite ends of slot 57, part 53 engages shoulders 58, to prevent rotary movement of part 53 relative to the meter body. Part 52 also projects radially outwardly through slot 57, but only at the location of an actuating element 62, by which the part 52 is turned relative to part 53. A detent lug 63 formed on part 62 may coact with apertures 64 in flange 60 to releasably detent part 52 in any of different relative rotary positions.

Along its outer surface, flange 60 of part 53 carries a series of markings 65, which desirably read in terms of several different shutter time settings, such as 1/15 of a second, 1/30 of a second, 1/60 of a second, and 1/125 of a second. When actuating lug 62 of the valve unit 14 is positioned opposite any of the various shutter time markings 65 (with incident light collector dome 48 attached to the device) the meter is in a condition in which pointer 12 can read directly on scale 17 in terms of lens aperture settings for a camera.

The electrically actuated indicator unit within cylinder 23 is of the conventional type in which movement of pointer 12 along its range of movement is not directly proportional at all points to the amount of light falling on cell 15. For this reason, I provide, at a location axially adjacent pointer window 25, a channel chart 66 which acts to convert the pointer readings to uniformly spaced markings at the bottom of the chart whose spacing is completely proportional to the amount of light energization of cell 15. For this purpose, chart 66 consists of a series of alternate black and white channels 67, which are defined by lines 68 disposed at suitable different angles to attain the desired result. At their ends which are directly adjacent lens aperture scale 17, lines 68 are spaced uniformly throughout the entire chart 66. At their opposite ends, these same lines 68 are spaced different distances apart, in correspondence with the characteristics of the electrically actuated indicator unit, so that movement of the pointer from any one line 68 to the next successive one will represent the same change in light intensity that is represented by movement of the pointer between any other two successive lines. The 0 setting of the pointer is represented at 69 in Fig. 7.

The lens aperture scale member or ring 17 has f-stop markings 70 formed on the outer surface thereof, and spaced circularly about axis 22 at intervals corresponding to the uniform spacing of the lower end portions of lines 68 on channel chart 66. Associated with each of the f-stop numbers 70 on scale member 17, there are provided small lines 71 directly adjacent the channel chart 66 and shutter time markings 72 on member 18, so that the lens aperture scale is directly readable against both the channel chart and the shutter time scale.

Radially inwardly of scale member 17, there is provided a ring 73, which is rigidly secured in any suitable manner to part 20, and which carries on its outer surface a series of film sensitivity numbers 74, only one of which is visible at a time through a window 75 formed in part 17. These markings 74 and window 75 are so positioned that, when part 17 is turned to a setting in which a particular one of the markings 74 is visible through window 75, this automatically pre-sets lens aperture scale member 17 to a condition in which it is suitably located with respect to the other elements of the meter to give proper readings, assuming the use of the particular film sensitivity which is visible through window 75. Axially beyond the f-stop markings 70 on scale member 17, this part 17 has a reduced diameter cylindrical portion 76, about which the shutter time scale member 18 is rotatably mounted. At the end of the meter, part 18 has a transverse end wall 77 extending along a correspondingly transverse end wall 78 of body part 20. A screw 79 extends through coaxial apertures 177 and 178 in walls 77 and 78, and carries a nut 180 and lock washer 181, to rotatably secure part 18—77 to the body. This screw 79 may have a cylindrical spacer shoulder 179, adjacent its head, the shoulder being received within aperture 177, but being larger than aperture 178, and the shoulder having a thickness slightly greater than that of wall 77, to maintain the screw head and wall 78 in such spaced relation as to allow rotary adjustment of part 18—77 relative to the body.

The reduced diameter portion 76 of part 17 has on its outer surface a series of EV (Exposure Value) numbers 80, which are selectively visible through a window 81 formed in part 18, to indicate to a user the exposure value number which corresponds to any particular setting of shutter scale member 18 relative to lens aperture scale number 17. The shutter time markings 72 on member 18 are preferably spaced uniformly in correspondence with the spacing of the f-stop markings on member 17, and for maximum convenience, should include all of the settings of valve unit 14, as indicated by markings 65.

The lens aperture scale member 74 is adapted to be releasably detented in positions in which any of the different film sensitivity numbers 74 are centered within window 75. For this purpose, I provide a detenting mechanism which is described more specifically, and is claimed, in my co-pending application Serial Number 749,856 filed July 21, 1958 on "Detent Structure," now abandoned. This detenting mechanism includes a leaf spring 82 (see Figs. 2, 3 and 6), which is located within the interior of part 20, and bears radially outwardly against three evenly circularly spaced ball detents 83 confined within apertures 84 in part 20. In the same transverse plane as that containing balls 83, part 17 contains a series of evenly circularly spaced apertures 85, within which balls 83 are partially receivable, to releasably detent part 18 in the desired different rotary positions. The three balls may be partially received at their inner sides within apertures 86, two of which are formed in the opposite ends of spring 82, and the third of which is formed in the end of an intermediate spring arm 87 formed by part 82. Preferably, the spacing of balls 83 is such that only one of the balls is received in one of the apertures 85 in any particular position of part 17, so that the part 17 has three times as many detented positions as there are apertures 85.

Referring now to Figs. 8 and 9, when the device is to be used as a reflected light meter, rather than for incident light readings, the collector unit 13 is removed from the meter, and the reflected light screen or grill 16 is substituted therefor. This screen 16 has a series of parallel axially extending apertures 88 which are so designed as to effectively pass reflected light to element 15. Part 16 is secured to the body by the same type of bayonet connection used in connection with incident light collector 13, and for this purpose, part 16 has in its outer surface a pair of bayonet connection grooves 89 formed the same as grooves 50 in Fig. 4, and adapted to coact with pins 49 to secure part 16 to the meter body. When reflected light unit 16 is in use, valve assembly 14 should be completely removed from the meter. In order to then close off valve slot 57 in a manner preventing the admission of any stray light through that slot, part 16 has an annular skirt 90 which projects into the interior of part 19 to a location past slot 57, to thus block off the slot. The outer surface of skirt 90 should be cylindrical, and of a diameter corresponding to the internal diameter of the engaged portion of element 19. Preferably, part 16 is formed of a suitable opaque resinous plastic material. In closing off slot 57 in the above discussed manner, part 16 also serves the secondary function of positively preventing accidental use of the meter as a reflected light device without removing valve unit 14.

To now describe the manner of use of the device shown in Figs. 1 through 9, assume first that it is desired to utilize the meter as an incident light device, and it is desired to take a picture utilizing an ASA–32 film, and utilizing a shutter time of $\frac{1}{30}$ of a second. With light collector unit 13 attached to the device, and with light valve 14 inserted in the meter, the valve is set to its $\frac{1}{30}$ of a second position. Also lens aperture scale member 17 is turned to a position in which the number "32" is visible through window 75. With the valve and member 17 set to these positions, the pointer 12 is then directly readable (through channel chart 66) on the lens aperture scale, to give a proper $f$-stop setting for the camera under any lighting conditions which may be encountered. For example, if the pointer moves to the position represented in Fig. 7, the operator merely allows his eye to follow along one of the lines 68 of the channel chart from the pointer to a corresponding reading on the lens aperture scale (an $f$-stop setting of 4 in the illustrated case), and the camera is then set in accordance with that reading to take the desired picture. If the pointer is positioned between two of the markings 68, or between two of the markings 71 on scale member 17, the operator can nevertheless judge rather easily the positioning of pointer 12 relative to the lens aperture scale.

If it is desired to utilize film of any other sensitivity, then part 17 is correspondingly adjusted, and if it is desired to use one of the other shutter times for which valve 14 can be adjusted, then the valve is set to that corresponding value. Thus, for any combination of the film sensitivities given at 74, and the shutter times for which the valve may be set, the meter can be direct reading. This covers the large majority of situations under which most photographers will desire to use the meter. In this connection, it is noted that, in the particular valve arrangement shown in the drawings, the valve is adapted to be set to several intermediate positions in addition to the four main settings marked on the face of the valve structure ($\frac{1}{15}$, $\frac{1}{30}$, $\frac{1}{60}$, and $\frac{1}{125}$ of a second). One of these intermediate positions may be the very conventionally utilized time of $\frac{1}{50}$ of a second, which may be designated by a special marking such as the diamond shaped marking. A similar diamond shaped marking may be provided at 92 for the conventional $\frac{1}{50}$ of a second setting on the main wide range shutter time scale of element 18.

Under the very unusual circumstances in which none of the very direct readings of the above discussed type will satisfy the particular photographic requirements at hand, then the shutter time scale member 18 can be utilized in conjunction with the other portions of the meter to make a second type of reading, which will give an entire series of usable lens aperture and shutter time combinations. For example, assume that the device is in the condition represented in Fig. 7, in which the valve is set for $\frac{1}{30}$ of a second, and the film sensitivity is set at ASA–32, but it is desired to utilize some shutter time other than $\frac{1}{30}$. The operator then merely turns shutter time scale member 18 until the index mark $\frac{1}{30}$ on that member is directly aligned with the lower end of the particular channel chart marking 68 which is located directly opposite pointer 12 (see Fig. 7). With the apparatus set in this condition, the user may then employ on the camera any set of lens aperture and shutter time values which are directly opposite one another on the scale members 17 and 18. That is, instead of $f$–4 and $\frac{1}{30}$ of a second shutter time, the operator might utilize $f$–2.8 and $\frac{1}{60}$ of a second or $f$–2 and $\frac{1}{125}$ of a second, etc. In this way, all possible photographic conditions can be met, and the device is therefore completely versatile. The same type of alternate reading can of course be effected with the value in any other setting, in which case the only change in procedure is to position a different index marking (on scale member 18) opposite the pointer position on the channel chart, instead of utilizing $\frac{1}{30}$ of a second as in the discussed example. If the valve is set at $\frac{1}{60}$ of a second, then the corresponding index marking $\frac{1}{60}$ on part 18 is positioned opposite the pointer reading on the channel chart, and a similar procedure is followed for any other setting of the valve.

Under very poor lighting conditions, it is desirable to utilize the meter in a maximum sensitivity condition. To attain such maximum sensitivity, valve unit 14 is completely removed (with dome 48 still in place), and the readings are then taken in a manner corresponding essentially to the second type of reading discussed above. For this purpose, the device is so designed that a particular predetermined index marking on scale member 18 can be utilized as a setting index for maximum sensitivity. If this predetermined index marking is moved to a position of alignment with the pointer track on channel chart 66 (with the valve out and dome 48 in place), the markings on the two scale members 17 and 18 will then give a series of lens aperture and shutter time combinations which may be utilized under the conditions ensuing. In a preferred form of the device, this maximum sensitivity index on scale member 18 is the one-half second setting, so that if valve 14 is removed, with incident light collector dome 48 in position, and with the proper ASA number being visible through window 75, a series of proper lens aperture and shutter time combinations can be obtained by merely positioning the one-half second setting opposite the lower end of the channel chart line 68 which is opposite the pointer. In other words, if the pointer were in the position of Fig. 7, the one-half second setting would be moved to the position at which the 1/30 second index is shown, and any pair of lens aperture and shutter time settings then positioned opposite one another on scale members 17 and 18 could be utilized in the camera.

When the reflected light screen 16 is being utilized instead of the incident light collector 13, the permissible settings of the camera are obtained by positioning still another predetermined index marking on the shutter time scale 72 opposite the pointer position on the channel chart. Preferably, the reading of 1/100 of a second is utilized for this purpose, so that if the 1/100 setting (at 93 in Fig. 7) is located opposite the lower end of the portion of the channel chart which corresponds to the positioning of the pointer, then any set of lens aperture and shutter time values given by opposed readings on members 17 and 18 can be utilized in the camera. As will be understood, the significant index to be utilized, in any particular condition of the device, as the index which is to be located opposite the pointer track is determined by the light transmitting characteristics of the light collector (48 or 16) taken in conjunction with the valve transmission condition.

When the operator is utilizing a camera which employs EV (Exposure Value) settings, the two scale members 17 and 18 are operated in exactly the same manner as has been discussed above, except that instead of reading a selected shutter time and lens aperture combination from these parts, the user instead reads the proper EV setting through window 81.

Fig. 10 represents fragmentarily a simplified variational form of meter 10a constructed in accordance with the invention, and which is essentially the same as that shown in Figs. 1 to 9 except that the valve unit 14 and its mounting slot are deleted. In this case, the meter may be so designed that its pointer 12a will give direct readings on lens aperture scale member 17a through channel chart 66a, assuming that a particular predetermined shutter time is utilized. For example, the meter may be designed to always give direct readings for 1/50 of a second shutter time, since that is a very common desired setting. As in the other form of the invention, the scale member 17a may be adjustable to compensate for different film sensitivities, and the shutter time scale 18a may be provided to allow for a second type of reading in which the 1/50 index is positioned opposite the pointer track so that the two scales will give an infinite number of usable shutter time and lens aperture combinations. Also, the various internal portions of the meter, and the pick-up elements, may be so designed that a reflected light pick-up screen such as that shown at 16 may be substituted for the incident light collector unit 13a, and the meter may in this form of the invention be designed to allow reading of the device in exactly the same manner regardless of which pick-up unit is in place. That is, in either condition, it is possible to either read the pointer position directly on the lens aperture scale, or to utilize the second type of reading by positioning the 1/50 index on the shutter time scale opposite the pointer track.

I claim:

1. A photographic light meter comprising a light sensitive element, a unit actuated by said light sensitive element and having an indicator part which automatically moves to different settings along a predetermined path in accordance with variations in the amount of light falling on said element, a channel chart extending alongside said path and having markings defining channels which convert irregularly spaced readings of said indicator part to uniformly spaced readings, a first scale member mounted for movement in essentially the same direction as said indicator part, markings associated with said first scale member and said channel chart and indicating different relative settings thereof and representing a series of different film sensitivities for which the scale member is preset in its different relative settings, said scale member having a lens aperture scale formed thereon positioned to be readable against said channel chart and said indicator in a relation such that the position of the indicator relative to said scale, as read through the channel chart, indicates directly on the scale a proper camera lens aperture setting for use under prevailing light conditions assuming a predetermined shutter time and assuming the film sensitivity for which said scale has been preset, and a second scale member mounted for movement in essentially the same direction as said indicator and having a shutter time scale formed thereon at a location to be readable against said lens aperture scale and against said channel chart and indicator, said shutter time scale being so positioned relative to said lens aperture scale and said channel chart and indicator that if a marking on the shutter time scale representing said predetermined shutter time is located in alignment with the position of said indicator as read through the channel chart, the various registering markings on the two scales will then give a series of lens aperture and shutter time combinations which are proper for use under prevailing light conditions, assuming said film sensitivity for which the first scale is preset.

2. A light meter as recited in claim 1, in which said lens aperture scale is located between said channel chart and said shutter time scale.

3. A light meter as recited in claim 1, in which said markings indicating different settings of said first scale member include a third scale which is stationary with respect to said channel chart and having markings representing different film sensitivities, and means forming a window in said first scale member through which a significant one of said film sensitivity markings is visible.

4. A light meter as recited in claim 1, including markings associated with the two scale members and indicating different settings of said second scale member relative to said first scale member and representing different Exposure Value numbers.

5. A light meter as recited in claim 1, including a series of Exposure Value numbers on said first scale member, and means forming a window in said second scale member through which a significant one of said Exposure Value numbers is visible.

6. A light meter as recited in claim 1, including means detenting the movement of said first scale member at positions spaced uniformly in accordance with the uniform spacing to which the channel chart converts the indicator settings.

7. A light meter as recited in claim 1, in which said meter has a cylindrical body with a transparent side wall, said indicator being a pointer at the inside of said wall movable arcuately about the axis of said body, said channel chart extending arcuately about the outside of said body, and said two scale members being essentially cylindrical rings rotatably carried about said body.

8. A photographic light meter comprising a light sensitive element, a unit actuated by said light sensitive element and having an indicator part which automatically moves to different settings along a predetermined path in accordance with variations in the amount of light falling on said element, a channel chart extending alongside said path and having markings defining channels which convert irregularly spaced readings of said indicator part to uniformly spaced readings, a first scale member mounted for movement in essentially the same direction as said indicator part, markings associated with said first scale member and said channel chart and indicating different relative settings thereof and representing a series of different film sensitivities for which the scale member is preset in its different relative settings, light valve means positioned in the path of light to said light sensitive element and actuable to a plurality of different conditions for passing different percentages of the available light to said element, markings indicating said different conditions of said light valve means and reading in terms of a plurality of different shutter times for which said valve means are preset in said different conditions, said first scale member having a lens aperture scale formed thereon positioned to be readable against said channel chart and said indicator in a relation such that the position of the indicator relative to said lens aperture scale, as read through the channel chart, indicates directly on the scale a proper camera lens aperture setting for use under prevailing light conditions assuming the shutter time and film sensitivity for which said valve means and said first scale have been preset, and a second scale member mounted for movement in essentially the same direction as said indicator and having a shutter time scale formed thereon at a location to be readable against said lens aperture scale and against said channel chart and indicator, said shutter time scale having markings representing said different shutter times for which said valve means can be preset, said shutter time scale being so positioned relative to said lens aperture scale and said channel chart and indicator that if a marking on the shutter time scale corresponding to the shutter time for which said valve means have been preset is located in alignment with the position of said indicator, as read through the channel chart, the various registering markings on the two scales will then give a series of lens aperture and shutter time combinations which are proper for use under prevailing light conditions, assuming the film sensitivity for which the first scale has been preset.

9. A light meter as recited in claim 8, including markings associated with the two scale members and indicating different settings of said second scale member relative to said first scale member and representing different Exposure Value numbers.

10. A light meter as recited in claim 8, in which said meter has a cylindrical body with a transparent side wall, said indicator being a pointer at the inside of said wall movable arcuately about the axis of said body, said channel chart extending arcuately about the outside of said body, and said two scale members being essentially cylindrical rings rotatably carried about said body, said lens aperture scale being located axially between and directly adjacent said shutter time scale and said channel chart.

11. A photographic light meter comprising a light sensitive element, a unit actuated by said light sensitive element and having an indicator part which automatically moves to different settings along a predetermined path in accordance with variations in the amount of light falling on said element, a first scale member mounted for movement in essentially the same direction as said indicator part, markings indicating different settings of said first scale member and representing a series of different film sensitivities for which the scale member is preset in its different relative settings, said scale member having a lens aperture scale formed thereon positioned to be readable against the positioning of said indicator in a relation such that the position of the indicator relative to said scale indicates directly on the scale a proper camera lens aperture setting for use under prevailing light conditions assuming a predetermined shutter time and assuming the film sensitivity for which said scale has been preset, and a second scale member mounted for movement in essentially the same direction as said indicator and having a shutter time scale formed thereon at a location to be readable against said lens aperture scale and against the position of said indicator, said shutter time scale being so positioned relative to said lens aperture scale and indicator that if a marking on the shutter time scale representing said predetermined shutter time is located in reading alignment with the position of said indicator the various registering markings on the two scales will then give a series of lens aperture and shutter time combinations which are proper for use under prevailing light conditions, assuming said film sensitivity for which the first scale is preset.

12. A photographic light meter comprising a light sensitive element, a unit actuated by said light sensitive element and having an indicator part which automatically moves to different settings along a predetermined path in accordance with variations in the amount of light falling on said element, a first scale member mounted for movement in essentially the same direction as said indicator part, markings associated with said first scale member indicating different settings thereof and representing a series of different film sensitivities for which the scale member is preset in its different settings, light valve means positioned in the path of light to said light sensitive element and actuable to a plurality of different conditions for passing different percentages of the available light to said element, markings indicating said different conditions of said light valve means and reading in terms of a plurality of different shutter times for which said valve means are preset in said different conditions, said first scale member having a lens aperture scale formed thereon positioned to be readable against said indicator in a relation such that the position of the indicator relative to said lens aperture scale indicates directly on the scale a proper camera lens aperture setting for use under prevailing light conditions assuming the shutter time and film sensitivity for which said valve means and said first scale have been preset, and a second scale member mounted for movement in essentially the same direction as said indicator and having a shutter time scale formed thereon at a location to be readable against said lens aperture scale and against said indicator, said shutter time scale having markings representing said different shutter times for which said valve means can be preset, said shutter time scale being so positioned relative to said lens aperture scale and indicator that if a marking on the shutter time scale corresponding to the shutter time for which said valve means have been preset is located in reading alignment with the position of said indicator the various registering markings on the two scales will then give a series of lens aperture and shutter time combinations which are proper for use under prevailing light conditions, assuming the film sensitivity for which the first scale has been preset.

References Cited in the file of this patent
UNITED STATES PATENTS

| | | |
|---|---|---|
| 2,147,999 | Tonnies | Feb. 21, 1939 |
| 2,214,283 | Norwood | Sept. 10, 1940 |
| 2,247,323 | Tonnies | June 24, 1941 |
| 2,275,344 | Bernhard et al. | Mar. 3, 1942 |
| 2,293,576 | Townsley | Aug. 18, 1942 |
| 2,667,809 | Williams | Feb. 2, 1954 |
| 2,714,329 | Pfaffenberger | Aug. 2, 1955 |
| 2,824,696 | Norwood | Feb. 25, 1958 |